US006927792B1

(12) United States Patent
Mimura et al.

(10) Patent No.: US 6,927,792 B1
(45) Date of Patent: Aug. 9, 2005

(54) TELEVISION CAMERA AND WHITE BALANCE CORRECTING METHOD

(75) Inventors: Masakazu Mimura, Osaka (JP); Nobuo Iwai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/936,307

(22) PCT Filed: Mar. 13, 2000

(86) PCT No.: PCT/JP00/01518

§ 371 (c)(1),
(2), (4) Date: Sep. 12, 2001

(87) PCT Pub. No.: WO00/54513

PCT Pub. Date: Sep. 14, 2000

(30) Foreign Application Priority Data

Mar. 11, 1999 (JP) .............................. P11-064641
Nov. 24, 1999 (JP) .............................. P11-332542

(51) Int. Cl.⁷ ............................ H04N 9/73; H04N 9/09
(52) U.S. Cl. ..................... 348/223.1; 348/265; 348/655
(58) Field of Search ......................... 348/223.1, 224.1, 348/225.1, 262, 263, 264, 265, 336, 337, 348/338; H04N 5/238, 5/243, 5/335, 9/097

(56) References Cited

U.S. PATENT DOCUMENTS

| 5,319,449 A | * | 6/1994 | Saito et al. ............... 348/223.1 |
| 5,530,474 A | * | 6/1996 | Takei ...................... 348/224.1 |
| 5,617,141 A | * | 4/1997 | Nishimura et al. ......... 348/366 |
| 5,818,523 A | * | 10/1998 | Ban ....................... 348/224.1 |

FOREIGN PATENT DOCUMENTS

| JP | 55-028653 | | 2/1980 | |
| JP | 04-317290 | | 11/1992 | |
| JP | 06-178198 | | 6/1994 | |
| JP | 06178198 A | * | 6/1994 | .......... H04N 5/243 |
| JP | 08-223587 | | 8/1996 | |

* cited by examiner

Primary Examiner—Wendy R. Garber
Assistant Examiner—Justin Misleh
(74) Attorney, Agent, or Firm—McDermott Will & Emery LLP

(57) ABSTRACT

The white balance of a television camera is not lost and kept properly even if the diaphragm is opened to the utmost limit at a dark place. A signal F representing the diaphragm value of the taking lens is inputted from an iris part 2 into a microcomputer 8. The level adjusting values of the R, G, and B signals are set in the microcomputer 8 according to the diaphragm signal F and sent to a white balance correcting circuit 6. The correcting circuit 6 adjusts the levels of the R, G, and B signals to the same value according to the level adjusting values.

10 Claims, 2 Drawing Sheets

TELEVISION CAMERA AND WHITE BALANCE CORRECTING METHOD

FIELD OF THE INVENTION

The present invention relates to a television camera and a white balance correcting method and, more particularly, to a television camera in which the white balance is not lost and colors kept properly even if the diaphragm of the optical system of the camera is opened to the utmost limit. The television camera includes not only its single unit, but also a unit in which the television camera and a recorder such as a video-tape recorder are integrated in one-piece, and a unit in which the television camera and a record/playback device such as a video-tape recorder are integrated in one-piece.

BACKGROUND OF THE INVENTION

In a television camera, respective levels of image signals for R, G and B channels corresponding to a white subject are adjusted to the same level, thereby keeping a white balance. This causes the white color to be reproduced to a color in which the coloring is not lost and is not different from that viewed by naked eyes, thereby improving the color reproducibility of the whole screen, even if a light radiating the subject is the sun light or an artificial light.

The correction of the white balance in conventional television cameras have been performed in the following manner. That is, a gain is adjusted so that the G signal level becomes the same level as the R signal and the B signal levels by setting the diaphragm value at value at which the optical properties of the taking lens become stable, for example, f 8.0, taking an image of a white subject on the whole screen, and performing the white balance correction.

Now, taking lenses of recent television cameras have been improved in the optical properties, and the signal processing technology has been progressed, so that most of them have the opening diaphragm value of about f 1.4, whereby they can take a subject even at a dark place because the range of the diaphragm spreads to opening side.

In cameras having the taking lens with such opening diaphragm value of about f 1.4, the white balance is successfully kept in a condition in which the diaphragm is closed in a manner that the diaphragm value exhibits a value, for example, more than f 2.8.

However, when an image is taken by opening the diaphragm near to the limit at which the diaphragm value exhibits a value less than f 2.8 in a place short of illumination such as in door, even though the white balance adjustment has been performed, the whole screen may be short of green color, or surplus of red color, so that the image may be colored slightly with magenta color (for short of green color) or with red color (for surplus of red color) to cause the color reproducibility to be decreased.

Hence, current situation is such that there has been made a selection of either one method in which an image is taken at a larger diaphragm value by making up illumination at image taker side in a place short of illumination, or that in which an image is taken by leaving the image colored slightly with magenta color or red color as it is.

Thus, the fact that, in image taking in a condition in which the diaphragm is opened neat to opening, the screen assumes magenta color or red color is because the trend of an increase in R, G and B signal levels associated with opening of the diaphragm becomes different near the diaphragm opening end so that G signal or R signal level becomes relatively lower (G signal) or becomes relatively higher (R signal) than other signal levels.

That is, as shown in the characteristic graph of FIG. 3, when opening the diaphragm near to opening, associated with it, the image signal level of the R, G and B channels obtained through a solid image sensor device (commonly known as CCD) corresponding to a three-color separation optical system and to respective colors increases, while in a region where the diaphragm is relatively closed, the trend of an increase in the R, G and B signals (each of which is an image signal) is uniform.

On the other hand, in a region where the diaphragm is largely opened and the diaphragm value exhibits f 2.8 or less, the increasing trend varies among the R, G and B signals such that for the G signal, its level becomes lower than that of other color signals, and for the R signal, its level higher than that of other color signals.

It is assumed that such characteristics are due to the way of how to deploy the light separated by a prism (where the G signal decreases) or to a variation in the light collecting characteristics of colors in respective solid image sensor device (where the R signal increases), and such characteristics are unique to television cameras using the solid image sensor device, or to three-tube, three-plate type cameras having a color separation optical system such as prism.

In conventional white balance correcting method, taking a slightly closed diaphragm value such as f 8.0 as a reference, by level adjusting the R, G and B signals under such certain diaphragm value, the white balance for the whole region of diaphragm is kept uniformly, thereby providing a method neglecting the decrease of the G signal level or the increase of the R signal level at the diaphragm opening end.

Hence, thereafter taking an image by opening the diaphragm near to the limit causes the G signal or the R signal to tend to be decreased or increased with respect to other signal levels, in spite of the white balance adjustment in advance, whereby the green color is short, or the red color is surplus, so that the image assumes magenta color or red color.

Therefore, it is an object of the present invention is to provide a television camera and a white balance correcting method wherein even in a condition in which the diaphragm is opened to the limit, the white balance is properly kept so that even in a place having a small quantity of light, an image having a good color reproducibility is obtained.

SUMMARY OF THE INVENTION (1) A television camera of the present invention, which adjusts the level of the R, G and B signals obtained through a three-color separation optical system to keep the white balance, includes control means for setting the level adjusting values of the R, G and B signals according to the diaphragm signal indicating the diaphragm condition of a taking lens, and white balance correction means for adjusting the levels of the R, G and B signals according to the above-mentioned level adjusting values, so that the level adjustment suited for the trend in the increase of these signal levels associated with the opening of the diaphragm near to the limit is performed with respect to the R, G and B signals, and thus even in a condition in which the diaphragm is opened to the limit because of illumination being short, a proper white balance correction is performed.

In the television camera of the present invention, the level adjusting value in the above-mentioned control means is set at a value by which the level of one signal of either the G signal or the R signal is relatively made even with that of other both signals. For example, in the case where the diaphragm is opened beyond a predetermined limit, the level adjusting value is set at a value by which the level of one signal of either the G signal or the R signal is relatively increased or decreased with respect to that of other both signals.

In such a case, although in general television cameras, due to the three-color separation optical system and to the CCD construction, when opening the diaphragm near to the opening end, there are indicated characteristics in which the level of arbitrary signal (G signal, R signal, or the like) is decreased (in case of G signal) or increased (in case of R signal) relatively to that of other both signals (both R and B signals, and the like), by setting of the level adjusting value as mentioned above, the level adjustment is performed in a manner to make up the gap among the R, G and B signals, whereby a white balance further adapted to an actual camera optical system is performed.

In the present invention, with the above-mentioned improved television camera, setting of the level adjusting value in the control means and level adjusting according to the level adjusting value in the white balance correction circuit are performed in response to the change in the diaphragm condition of the above-mentioned lens, whereby only changing the diaphragm causes the correction of the white balance matched with the diaphragm condition to be automatically performed.

(2) The white balance correcting method of the present invention is such that in keeping the white balance by adjusting the levels of the R, G and B signals obtained through the three-color separation optical system, the level adjusting values of the R, G and B signals are set according to the diaphragm condition of the taking lens, and then the levels of the R, G and B signals are adjusted by the above-mentioned level adjusting value. The level adjustment suited for the trend in the increase of these signal levels associated with the opening of the diaphragm near to the limit is performed with respect to the R, G and B signals, whereby even in a condition in which the diaphragm is opened to the limit because of illumination being short, a proper white balance correction is performed.

BEST MODE FOR CARRYING OUT THE INVENTION

Figure 1:
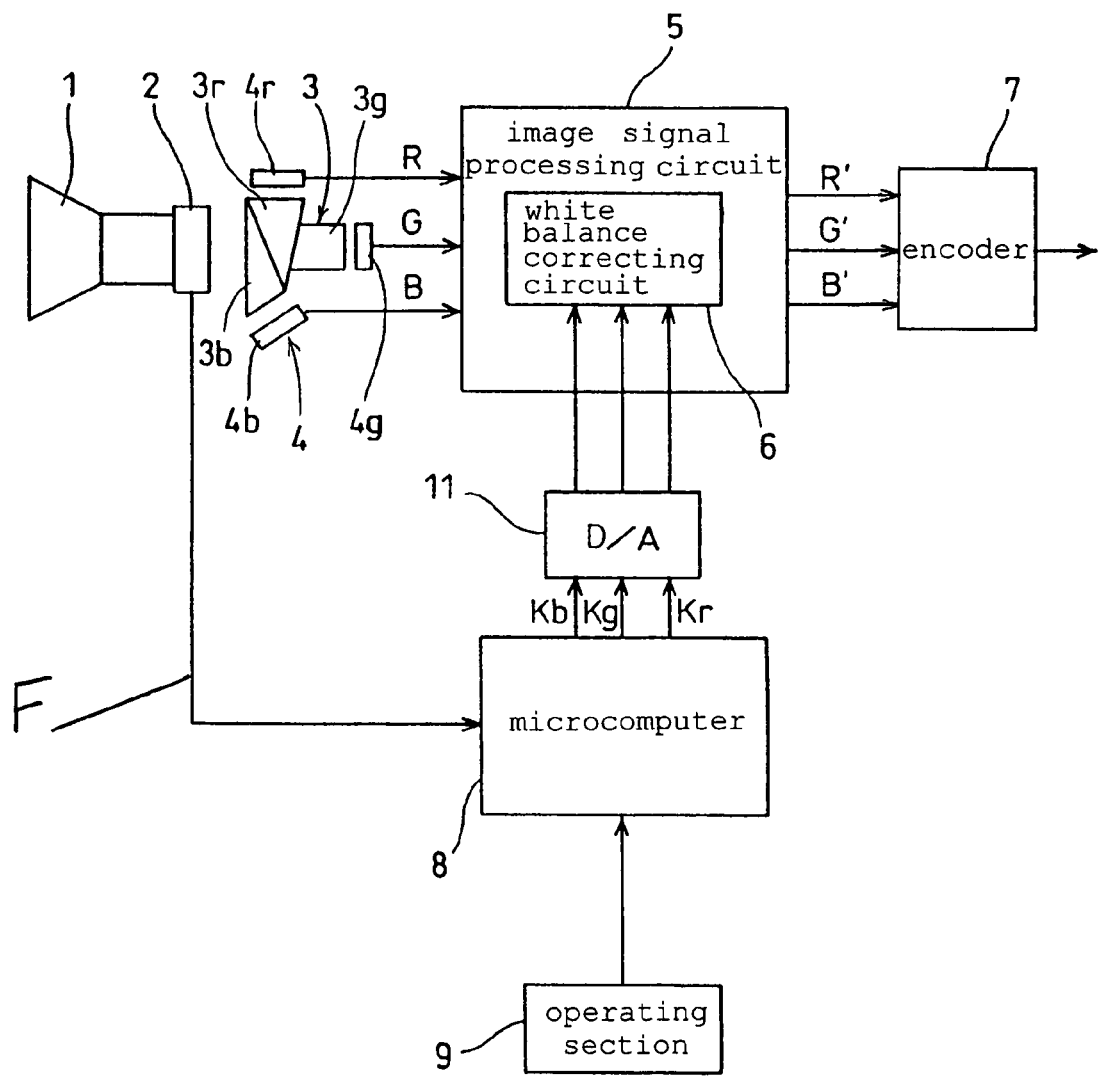
FIG. 1 is a block diagram of a white balance correcting device according to an embodiment of the present invention included in a television camera.

With reference to FIG. 1, the best mode of the present invention will be explained in detail hereinafter. The present invention, though applied to a broadcasting television camera to explain, is not limited to the television camera for such application.

Referring to FIG. 1, a subject (not shown) is taken by a taking lens 1. A taking light passing through the taking lens 1 is inputted into an iris section 2. The iris section 2 adjusts an amount of light radiated to the taking face of an image sensor device, which will be described later. A prism-type, three-color separation optical system 3 separates the taking light passing through the iris section 2 into three-color light components: red color (R), green color (G) and blue color (B). Although as another system of the three-color separation optical system, there are, for example, a dichroic mirror system and others, the present invention is not limited to these systems.

The three-color separation optical system 3, as well known, is a combination of three prisms 3r, 3g and 3b, from which these three prisms 3r, 3g and 3b, a red-color light, a green-color light and a blue-color light are emitted, respectively. In this case, respective prisms 3r, 3g and 3b are provided with a reflecting filter or a trimming filter of a dichroic film.

A solid image sensor device (CCD) 4 comprises an image sensor device 4r facing the prism 3r for radiating the red-color light through the prism 3r from the taking face, an image sensor device 4g facing the prism 3g for radiating the green-color light through the prism 3g from the taking face, and an image sensor device 4b facing the prism 3b for radiating the blue-color light through the prism 3b from the taking face.

The image sensor devices 4r, 4g and 4b process the red-color light, green-color light and blue-color light for an image radiated from the prisms 3r, 3g and 3b to the R, G and B signals, respectively, and output them to an image signal processing circuit 5.

The image signal processing circuit 5 processes the R, G and B signals from the image sensor devices 4r, 4g and 4b for amplification and the like, and then the R, G and B signals having been subjected to the processing of amplification and the like are encoded by an encoder 7 into composite color image signals of NTSC system, PAL system, SECAM system or the like to be outputted.

Such an image signal processing circuit 5 contains a white balance correcting circuit 6. A microcomputer 8 acts as control means for white balance correction, and at the same time, performs various controls corresponding to the operation contents of an operating section 9.

The iris section 2 performs the opening/closing operation of the diaphragm of the taking lens 1 according to the control from a diaphragm adjusting mechanism (not shown) for closing the aperture of the taking lens 1 to adjust the above-mentioned amount of light radiated, and at the same time, outputs a signal indicating the opening condition of the diaphragm, that is, a diaphragm signal F to the microcomputer 8.

Figure 2:
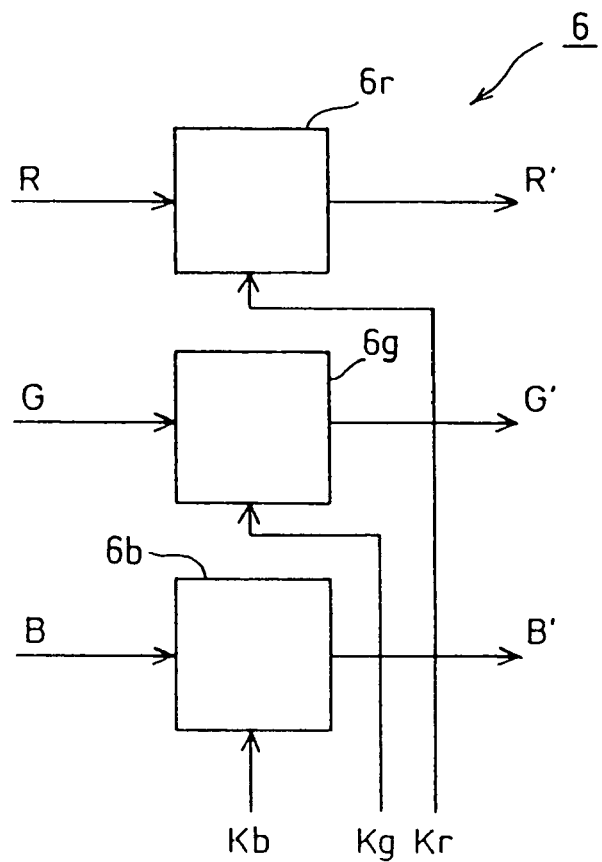
FIG. 2 is a detailed diagram of the white balance correcting circuit shown in FIG. 1.

The white balance correcting circuit 6 in the image signal processing circuit 5, as shown as an example in FIG. 2, comprises three analog multipliers 6r, 6g and 6b for multiplying individually the R, G and B signals, which have been outputted from the image sensor devices 4r, 4g and 4b and subjected to the processing of amplification and the like, by a coefficient to perform level adjustment. R, G and B designate the R, G and B signals before being corrected for white balance, and R', G' and B' designate the R, G and B signals after being corrected for white balance.

The microcomputer 8 adjusts multiplying coefficients Kr, Kg and Kb used in the analog multipliers 6r, 6g and 6b according to the data inputted from the iris section 2, and at the same time, inputs the multiplying coefficients thus adjusted to the analog multipliers 6r, 6g and 6b, thereby adjusting the levels of the R, G and B image signals to correct the white balance.

More particularly, the microcomputer 8, as with the control unit of conventional white balance correcting device, performs division of the image region formed of the R, G and B signals, detection of the image region corresponding to a white subject, calculation of the levels of the R, G and B image signals in the image region, and the like, in addition to, stores the multiplying coefficients (level adjusting value of the R, G and B signals) used in the analog multipliers 6r, 6g and 6b configuring the white balance correcting circuit 6, and supplies them to respective analog multipliers.

Further, the microcomputer 8 stores the multiplying coefficients supplied to the white balance correcting circuit 6 by bringing them into correspondence with the whole of the diaphragm regions. The multiplying coefficients correspond to the adjusting value of the white balance, and have been set by the white balance correcting operation previously performed, and the multiplying coefficients corresponding to the adjusting value of the white balance have been stored in the microcomputer 8.

Figure 3:
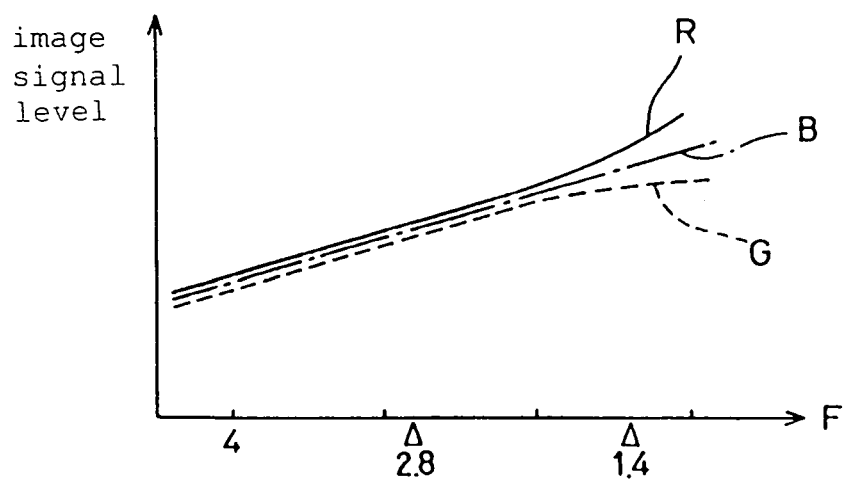
FIG. 3 is a characteristic graph of an image signal showing a relationship between the levels of the R, G and B signals obtained through the three-color separation optical system from a white subject and the diaphragm value.

Here, the adjusting value of the white balance set by the white balance correcting operation previously performed corresponds to the lens diaphragm (e.g. general-purpose diaphragm value f 8.0) set at the time of the white balance correcting operation, and thus does not correspond to all diaphragms in one-to-one correspondence. More specifically, opening the diaphragm near to the opening end (f 2.8 or lower) causes a fixed white balance adjusting value to provide an insufficient correction. This is caused by the fact that, as explained in the above-described FIG. 3, in the trend in the increase of signal level associated with the opening of the diaphragm, the G signal or the R signal is different from other signals. The different trend described here means, more specifically, for example, a trend in which the trend in the increase of the G signal becomes more gentle than that of the R and B signals, or the trend in the increase of the R and B signals becomes more steep than that of G signal, or the trend in the increase of the R signal becomes more steep than that of the G and B signals, or the trend in the increase of the G and B signals becomes more gentle than that of R signal.

Thus, the microcomputer 8, in a condition in which the diaphragm of the lens is not opened near to the opening end (or in which the diaphragm is closed more than f 2.8), sets fixed multiplying coefficients to the R, G and B signals according to the white balance correcting operation previously performed. On the other hand, in a condition in which the diaphragm of the lens is opened near to the opening end (or in which the diaphragm is opened beyond f 2.8), the following is performed.

That is, the microcomputer 8 makes slightly larger the multiplying coefficient for the G signal than that for both the R and B signals, and further in such a manner that the larger the diaphragm is opened, the larger the degree of the relative increase in the multiplying coefficient is made. More specifically, the multiplying coefficient for the G signal is set in such a manner that the signal level of the G signal is raised to that of both the R and B signals. Or, the multiplying coefficient for both the R and B signals is set in such a manner that the signal level of the R and B signals is lowered to that of the G signal.

On the other hand, the microcomputer 8 also makes slightly smaller the multiplying coefficient for the R signal than that for both the G and B signals, and further in such a manner that the larger the diaphragm is opened, the smaller the degree of the relative decrease in the multiplying coefficient is made. More specifically, the multiplying coefficient for the R signal is set in such a manner that the signal level of the R signal is lowered to that of both the G and B signals. Or, the multiplying coefficient for both the G and B signals is set in such a manner that the signal level of the G and B signals is raised to that of the R signal.

This improves the adjusting accuracy of the white balance which becomes unstable in the diaphragm region near the opening end. In addition to, this further improves the adjusting accuracy by varying the multiplying coefficient following the variation in the diaphragm in the diaphragm region near the opening end. That is, although in the diaphragm region near the opening end, the white balance reacts sensitively to the variation in the diaphragm to cause the correction to become further unstable, as described above, the white balance correcting accuracy in the diaphragm region near the opening end is improved by varying the multiplying coefficient following the variation in the diaphragm in the diaphragm region near the opening end.

The microcomputer 8 stores in a form of table or numerical formula the multiplying coefficient corresponding to the white balance adjusting value, and in correspondence with the diaphragm signal F inputted from the iris section 2, outputs the multiplying coefficients for the R. G and B signals corresponding to the diaphragm f. The multiplying coefficients are supplied through a D/A converter 11 to the white balance correcting circuit 6.

The white balance correcting circuit 6 changes the gain of the R, G and B signals according to the multiplying coefficients supplied from the microcomputer 8, and adjusts the level of the R, G and B signals to become the same level. In fact, for example, the circuit 6 makes even the level of the G signal with that of both the R and B signals, or the level of the R signal with that of both the G and B signals. In this case, there may be set such that the level of the G signal or the R signal is caused to be increased or decreased, or that the level of the R and B signals or the G and B signals are caused to be decreased or increased.

In the above-mentioned configuration, the image light from a subject is radiated from the lens 1 through the iris section 2, separated by the three-color separation optical system 3 into three-color lights, red color, green color and blue color lights, which lights are radiated to respective image sensor devices 4r, 4g and 4b. Then, outputted from respective image sensor devices 4r, 4g and 4b are the R, G and B signals corresponding to the color lights, which R, G and B signals are inputted into the white balance correcting circuit 6.

The microcomputer 8 sets the white balance adjusting value (multiplying coefficient) according to the diaphragm signal F inputted from the iris section 2, and gives the value to the white balance correcting circuit 6.

The white balance correcting circuit 6 adjusts the level of the R, G and B signals to become the same level according to the multiplying coefficients corresponding to the white balance adjustment given from the microcomputer 8, thereby keeping white balance. Even where the diaphragm is opened near to the opening limit because of illumination being short, the G signal at a relatively low level or the R signal at a relatively high level is made even with the level of the R and B signals or the G and B signals, so that the white balance is not lost.

A series of white balance correcting operations such as the setting of the level adjusting value at the microcomputer 8, and the level adjusting at the white balance correcting circuit 6 according to the adjusting value may be performed in response to the change in the diaphragm signal F outputted from the iris section 2, or in response to the instruction signal (inputted in the operating section 9 according to the diaphragm set by the operator) from the operating section 9.

Where a series of white balance correcting operations are performed in response to the change in the diaphragm signal F, only changing the diaphragm causes the correction of the white balance matched with the diaphragm region to be automatically performed.

Although in the form of the above-mentioned performance, the white balance correcting circuit is configured as an analog circuit, it will be appreciated that white balance correcting means may be configured in the microcomputer 8 in software.

Further, in the form of the above-mentioned performance, configuration has been made such that the diaphragm signal F is outputted from the iris section 2. This is the most suitable configuration where the present invention is performed in a video recorder integral with camera. However, even in a configuration in which the white balance correcting device is separated from the lens section (e.g. where the white balance correcting device is separated from the video camera), the present invention can be embodied, and in the case, a signal indicating the diaphragm condition of the diaphragm is inputted from the outside to the white balance correcting device.

Also, although in the form of the above-mentioned performance, there has been explained that the relative adjusting of the G signal and the relative adjusting of the R signal are separately performed, the explanation is made for clarity, and it will be appreciated that the adjusting of both the signals is performed in complete harmony. In essence, even when the degree of the diaphragm opening of the iris section varies, it is sufficient to adjust the level of both the signals so that the white balance is kept at a good accuracy.

Further, although in the form of the above-mentioned performance, the configuration has been made in which the adjusting to make relatively even the level of the G signal with both the R and B signals, and the adjusting to make relatively even the level of the R signal with both the G and B signals are simultaneously performed, it will be appreciated that only either of them may be preformed, and the configuration may be made in which the adjusting to make relatively even the level of the B signal with both the R and G signals is also simultaneously performed.

INDUSTRIAL APPLICABILITY

With the present invention, the level adjusting of the R, G and B signals according to the degree of the diaphragm opening of the iris section is performed, and even in a condition in which the diaphragm is opened near to the limit, the levels of the R, G and B signals are made even to the same level, so that even when an image is taken by largely opening the diaphragm in a place short of illumination, the white balance is not lost and an image having a good color reproducibility is obtained, whereby the television camera of the present invention is suitably utilized as the television camera for such image.

What is claimed is:

1. A television camera which adjusts levels of R, G, and B signals obtained through a three-color separation optical system to maintain white balance, said television camera comprising:

an iris section for performing an opening/closing operation of a diaphragm of a taking lens, and outputting a diaphragm signal indicating an opening condition of the diaphragm;

a microcomputer for inputting the diaphragm signal from the iris section, and setting level adjusting values of the R, G, and B signals; and white balance correcting means for adjusting levels of the R, G, and B signals according to the level adjusting values, wherein said white balance correcting means has three analog multipliers for multiplying individually the R, G, and B signals before being white balance corrected with multiplying coefficients thereto, and outputting individually the individually multiplied values as the R, G, and B signals after being white balance corrected, wherein said microcomputer stores the multiplying coefficients as said level adjusting values by bringing the multiplying coefficients into correspondence with a whole of diaphragm regions of the taking lens, wherein in a condition in which the diaphragm of the taking lens is not opened near to an opening end, said microcomputer outputs said stored multiplying coefficients to said analog multipliers, wherein in a condition in which the diaphragm of the taking lens is opened near to the opening end, said microcomputer sets individually said multiplying coefficients in such a manner that a level of at least one arbitrary signal of the R, G, and B signals is made substantially even to that of at least one of other R, G, and B signals, and outputs said individually set multiplying coefficients to said analog multipliers, wherein setting level adjusting values of the R, G, and B signals and level adjusting according to said setting are performed in response to a change in the diaphragm condition of said taking lens, and wherein said at least one arbitrary signal is the signal G.

2. A television camera which adjusts levels of R, G, and B signals obtained through a three-color separation optical system to maintain white balance, said television camera comprising:

an iris section for performing an opening/closing operation of a diaphragm of a taking lens, and outputting a diaphragm signal indicating an opening condition of the diaphragm;

a microcomputer for inputting the diaphragm signal from the iris section, and setting level adjusting values of the R, G, and B signals; and white balance correcting means for adjusting levels of the R, G, and B signals according to the level adjusting values, wherein said white balance correcting means has three analog multipliers for multiplying individually the R, G, and B signals before being white balance corrected with multiplying coefficients thereto, and outputting individually the individually multiplied values as the R, G, and B signals after being white balance corrected, wherein said microcomputer stores the multiplying coefficients as said level adjusting values by bringing the multiplying coefficients into correspondence with a whole of diaphragm regions of the taking lens, wherein in a condition in which the diaphragm of the taking lens is not opened near to an opening end, said microcomputer outputs said stored multiplying coefficients to said analog multipliers, wherein in a condition in which the diaphragm of the taking lens is opened near to the opening end, said microcomputer sets individually said multiplying coefficients in such a manner that a level of at least one arbitrary signal of the R, G, and B signals is made substantially even to that of at least one of other R, G, and B signals, and outputs said individually set multiplying coefficients to said analog multipliers, wherein setting level adjusting values of the R, G, and B signals and level adjusting according to said setting are performed in response to a change in the diaphragm condition of said taking lens, and wherein said at least one arbitrary signal is the signal R.

3. A television camera which adjusts levels of R, G, and B signals obtained through a three-color separation optical system to maintain white balance, said television camera comprising:

an iris section for performing an opening/closing operation of a diaphragm of a taking lens, and outputting a diaphragm signal indicating an opening condition of the diaphragm;

a microcomputer for inputting the diaphragm signal from the iris section, and setting level adjusting values of the R, G, and B signals; and white balance correcting means for adjusting levels of the R, G, and B signals according to the level adjusting values, wherein said white balance correcting means has three analog multipliers for multiplying individually the R, G, and B signals before being white balance corrected with multiplying coefficients thereto, and outputting individually the individually multiplied values as the R, G, and B signals after being white balance corrected, wherein said microcomputer stores the multiplying coefficients as said level adjusting values by bringing the multiplying coefficients into correspondence with a whole of diaphragm regions of the taking lens, wherein in a condition in which the diaphragm of the taking lens is not opened near to an opening end, said microcomputer outputs said stored multiplying coefficients to said analog multipliers, wherein in a condition in which the diaphragm of the taking lens is opened near to the opening end, said microcomputer sets individually said multiplying coefficients in such a manner that a level of at least one arbitrary signal of the R, G, and B signals is made substantially even to that of at least one of other R, G, and B signals, and outputs said individually set multiplying coefficients to said analog multipliers, wherein setting level adjusting values of the R, G, and B signals and level adjusting according to said setting are performed in response to a change in the diaphragm condition of said taking lens, and wherein said at least one arbitrary signal is the signal B.

4. A television camera which adjusts levels of R, G, and B signals obtained through a three-color separation optical system to maintain white balance, said television camera comprising:

an iris section for performing an opening/closing operation of a diaphragm of a taking lens, and outputting a diaphragm signal indicating an opening condition of the diaphragm;

a microcomputer for inputting the diaphragm signal from the iris section, and setting level adjusting values of the R, G, and B signals; and white balance correcting means for adjusting levels of the R, G, and B signals according to the level adjusting values, wherein said white balance correcting means has three analog multipliers for multiplying individually the R, G, and B signals before being white balance corrected with multiplying coefficients thereto, and outputting individually the individually multiplied values as the R, G, and B signals after being white balance corrected, wherein said microcomputer stores the multiplying coefficients as said level adjusting values by bringing the multiplying coefficients into correspondence with a whole of diaphragm regions of the taking lens, wherein in a condition in which the diaphragm of the taking lens is not opened near to an opening end, said microcomputer outputs said stored multiplying coefficients to said analog multipliers, wherein in a condition in which the diaphragm of the taking lens is opened near to the opening end, said microcomputer sets individually said multiplying coefficients in such a manner that a level of at least one arbitrary signal of the R, G, and B signals is made substantially even to that of at least one of other R, G, and B signals, and outputs said individually set multiplying coefficients to said analog multipliers, wherein setting level adjusting values of the R, G, and B signals and level adjusting according to said setting are performed in response to a change in the diaphragm condition of said taking lens.

5. A television camera which adjusts levels of R, G, and B signals obtained through a three-color separation optical system to maintain white balance, said television camera comprising:

an iris section for performing an opening/closing operation of a diaphragm of a taking lens, and outputting a diaphragm signal indicating an opening condition of the diaphragm;

a microcomputer for inputting the diaphragm signal from the iris section, and setting level adjusting values of the R, G, and B signals; and white balance correcting means for adjusting levels of the R, G, and B signals according to the level adjusting values, wherein said white balance correcting means has three analog multipliers for multiplying individually the R, G, and B signals before being white balance corrected with multiplying coefficients thereto, and outputting individually the individually multiplied values as the R, G, and B signals after being white balance corrected, wherein said microcomputer stores the multiplying coefficients as said level adjusting values by bringing the multiplying coefficients into correspondence with a whole of diaphragm regions of the taking lens, wherein in a condition in which the diaphragm of the taking lens is not opened near to an opening end, said microcomputer outputs said stored multiplying coefficients to said analog multipliers, wherein in a condition in which the diaphragm of the taking lens is opened near to the opening end, said microcomputer sets individually said multiplying coefficients in such a manner that a level of at least one arbitrary signal of the R, G, and B signals is made substantially even to that of at least one of other R, G, and B signals, and outputs said individually set multiplying coefficients to said analog multipliers.

6. A television camera white balance correcting method for adjusting levels of R, G, and B signals obtained through a three-color separation optical system to maintain white balance, said television camera white balance correcting method comprising the steps of:

a) performing an opening/closing operation of a diaphragm of a taking lens, and outputting a diaphragm signal indicating an opening condition of the diaphragm;

b) inputting the diaphragm signal from the step a) into a microcomputer, said microcomputer operative to set level adjusting values of the R, G, and B signals;

c) adjusting the levels of the R, G, and B signals according to the level adjusting values;

d) multiplying individually the R, G, and B signals before being white balance corrected with multiplying coefficients thereto, and outputting individually the individually multiplied values as the R, G, and B signals after being white balance corrected; and e) storing the multiplying coefficients as said level adjusting values by bringing the multiplying coefficients into correspondence with a whole of diaphragm regions of the taking lens, wherein in a condition in which the diaphragm of the lens is not opened near to an opening end, said microcomputer outputs said stored multiplying coefficients, and wherein in a condition in which the diaphragm of the lens is opened near to the opening end, said microcomputer sets individually said multiplying coefficients in such a manner that a level of at least one arbitrary signal of the R, G, and B signals is made substantially even to that of at least one of other R, G, and B signals.

7. A television camera white balance correcting method for adjusting levels of R, G, and B signals obtained through a three-color separation optical system to maintain white balance, said television camera white balance correcting method comprising the steps of:

a) performing an opening/closing operation of a diaphragm of a taking lens, and outputting a diaphragm signal indicating an opening condition of the diaphragm;

b) inputting the diaphragm signal from the step a) into a microcomputer, said microcomputer operative to set level adjusting values of the R, G, and B signals;

c) adjusting the levels of the R, G, and B signals according to the level adjusting values;

d) multiplying individually the R, G, and B signals before being white balance corrected with multiplying coefficients thereto, and outputting individually the individually multiplied values as the R, G, and B signals after being white balance corrected; and e) storing the multiplying coefficients as said level adjusting values by bringing the multiplying coefficients into correspondence with a whole of diaphragm regions of the taking lens, wherein in a condition in which the diaphragm of the lens is not opened near to an opening end, said microcomputer outputs said stored multiplying coefficients, and wherein in a condition in which the diaphragm of the lens is opened near to the opening end, said microcomputer sets individually said multiplying coefficients in such a manner that a level of at least one arbitrary signal of the R, G, and B signals is made substantially even to that of at least one of other R, G, and B signals, wherein setting level adjusting values of the R, G, and B signals and level adjusting according to said setting are performed in response to a change in the diaphragm condition of said taking lens, and wherein said at least one arbitrary signal is the signal G.

8. A television camera white balance correcting method for adjusting levels of R, G, and B signals obtained through a three-color separation optical system to maintain white balance, said television camera white balance correcting method comprising the steps of:

a) performing an opening/closing operation of a diaphragm of a taking lens, and outputting a diaphragm signal indicating an opening condition of the diaphragm;

b) inputting the diaphragm signal from the step a) into a microcomputer, said microcomputer operative to set level adjusting values of the R, G, and B signals;

c) adjusting the levels of the R, G, and B signals according to the level adjusting values;

d) multiplying individually the R, G, and B signals before being white balance corrected with multiplying coefficients thereto, and outputting individually the individually multiplied values as the R, G, and B signals after being white balance corrected; and e) storing the multiplying coefficients as said level adjusting values by bringing the multiplying coefficients into correspondence with a whole of diaphragm regions of the taking lens, wherein in a condition in which the diaphragm of the lens is not opened near to an opening end, said microcomputer outputs said stored multiplying coefficients, and wherein in a condition in which the diaphragm of the lens is opened near to the opening end, said microcomputer sets individually said multiplying coefficients in such a manner that a level of at least one arbitrary signal of the R, G, and B signals is made substantially even to that of at least one of other R, G, and B signals, wherein setting level adjusting values of the R, G, and B signals and level adjusting according to said setting are performed in response to a change in the diaphragm condition of said taking lens, and wherein said at least one arbitrary signal is the signal R.

9. A television camera white balance correcting method for adjusting levels of R, G, and B signals obtained through a three-color separation optical system to maintain white balance, said television camera white balance correcting method comprising the steps of:

a) performing an opening/closing operation of a diaphragm of a taking lens, and outputting a diaphragm signal indicating an opening condition of the diaphragm;

b) inputting the diaphragm signal from the step a) into a microcomputer, said microcomputer operative to set level adjusting values of the R, G, and B signals;

c) adjusting the levels of the R, G, and B signals according to the level adjusting values;

d) multiplying individually the R, G, and B signals before being white balance corrected with multiplying coefficients thereto, and outputting individually the individually multiplied values as the R, G, and B signals after being white balance corrected; and e) storing the multiplying coefficients as said level adjusting values by bringing the multiplying coefficients into correspondence with a whole of diaphragm regions of the taking lens, wherein in a condition in which the diaphragm of the lens is not opened near to an opening end, said microcomputer outputs said stored multiplying coefficients, and wherein in a condition in which the diaphragm of the lens is opened near to the opening end, said microcomputer sets individually said multiplying coefficients in such a manner that a level of at least one arbitrary signal of the R, G, and B signals is made substantially even to that of at least one of other R, G, and B signals, wherein setting level adjusting values of the R, G, and B signals and level adjusting according to said setting are performed in response to a change in the diaphragm condition of said taking lens, and wherein said at least one arbitrary signal is the signal B.

10. A television camera white balance correcting method for adjusting levels of R, G, and B signals obtained through a three-color separation optical system to maintain white balance, said television camera white balance correcting method comprising the steps of:

a) performing an opening/closing operation of a diaphragm of a taking lens, and outputting a diaphragm signal indicating an opening condition of the diaphragm;

b) inputting the diaphragm signal from the step a) into a microcomputer, said microcomputer operative to set level adjusting values of the R, G, and B signals;

c) adjusting the levels of the R, G, and B signals according to the level adjusting values;

d) multiplying individually the R, G, and B signals before being white balance corrected with multiplying coefficients thereto, and outputting individually the individually multiplied values as the R, G, and B signals after being white balance corrected; and e) storing the multiplying coefficients as said level adjusting values by bringing the multiplying coefficients into correspondence with a whole of diaphragm regions of the taking lens, wherein in a condition in which the diaphragm of the lens is not opened near to an opening end, said microcomputer outputs said stored multiplying coefficients, and wherein in a condition in which the diaphragm of the lens is opened near to the opening end, said microcomputer sets individually said multiplying coefficients in such a manner that a level of at least one arbitrary signal of the R, G, and B signals is made substantially even to that of at least one of other R, G, and B signals, wherein setting level adjusting values of the R, G, and B signals and level adjusting according to said setting are performed in response to a change in the diaphragm condition of said taking lens.

* * * * *